Figure 1:
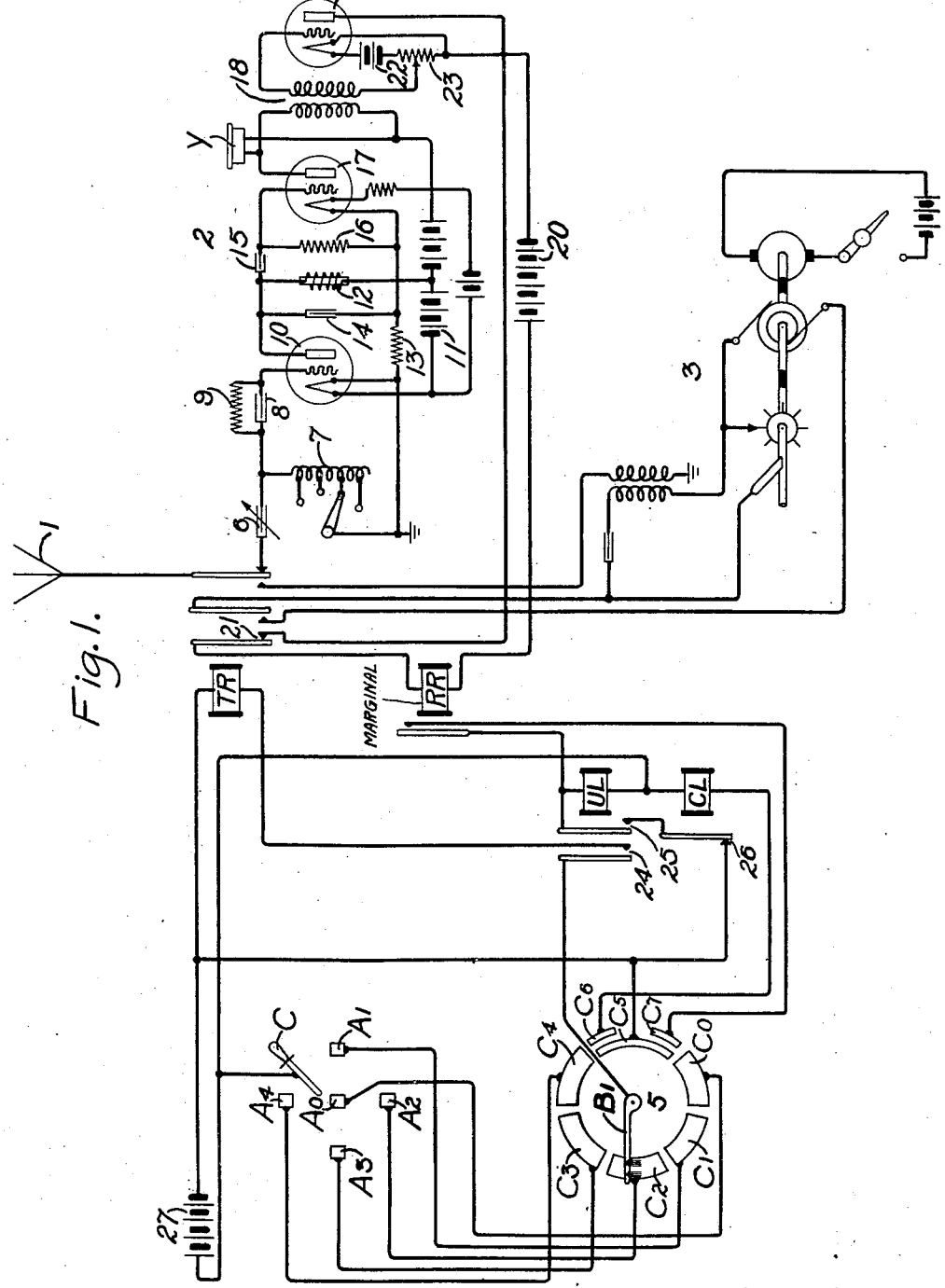

July 15, 1924.

A. A. OSWALD

REMOTE CONTROL SYSTEM

Filed Dec. 7, 1920   3 Sheets—Sheet 3

1,501,684

Inventor:
Arthur A. Oswald.
by C. A. Sprague, Atty.

Patented July 15, 1924.

1,501,684

UNITED STATES PATENT OFFICE.

ARTHUR A. OSWALD, OF BRADLEY BEACH, NEW JERSEY, ASSIGNOR TO WESTERN ELECTRIC COMPANY, INCORPORATED, OF NEW YORK, N. Y., A CORPORATION OF NEW YORK.

REMOTE CONTROL SYSTEM.

Application filed December 7, 1920. Serial No. 428,948.

*To all whom it may concern:*

Be it known that I, ARTHUR A. OSWALD, a citizen of the United States, residing at Bradley Beach, in the county of Monmouth, State of New Jersey, have invented certain new and useful Improvements in Remote Control Systems, of which the following is a full, clear, concise, and exact description.

This invention relates to remote control systems and particularly to radio systems for determining the course and operation of moving bodies such as airplanes.

An object of the invention is to provide means whereby a distant mechanism can be quickly brought under control.

Another object of the invention is to provide a teledynamic system in which interference with the controlled mechanism by foreign disturbances or by other controlling stations may be rendered difficult.

A further object of the invention is to provide means for preventing the transmission of false control impulses, and particularly to prevent false operation in consequence of transmission of control impulses at times when the controlled mechanism is not in proper impulse receiving condition.

A still further object is to provide means for giving an answer-back from a distant controlled mechanism to indicate that it is in control condition.

According to this invention, a transmitting apparatus at a control or primary station and a receiving apparatus at a controlled or secondary station are each provided with continuously moving mechanism such as rotary distributors which once in step are maintained in synchronism by synchronizing impulses transmitted from one of the stations, as for example, the primary station. The primary station which also sends out the control impulses is normally "locked" that is, is normally in such condition that no impulses of any kind can be sent out unless it is first unlocked by an unlocking impulse from the secondary. When unlocked it is held unlocked for substantially one cycle of its moving mechanism and during this cycle transmits either a synchronizing impulse to correct the phase of the secondary mechanism or such control impulses as are determined by the operator and finally automatically reverts to locked condition to await the arrival of another unlocking impulse. If it is desired to perform one particular operation at the secondary station a control impulse is sent out at a particular instant in the time cycle of the moving apparatus and if it is desired to perform a certain different operation, a control impulse is sent out at a correspondingly different instant. These control impulses received over circuits at the secondary station which are made responsive at the corresponding instants, as determined by the correspondingly operating mechanism, cause the various operations at the secondary station to be performed. When it is not desired to operate a control, the control circuits at the secondary station may be locked either by the synchronizing impulse transmitted from the primary station or by a special locking impulse transmitted for that purpose.

Figure 2:
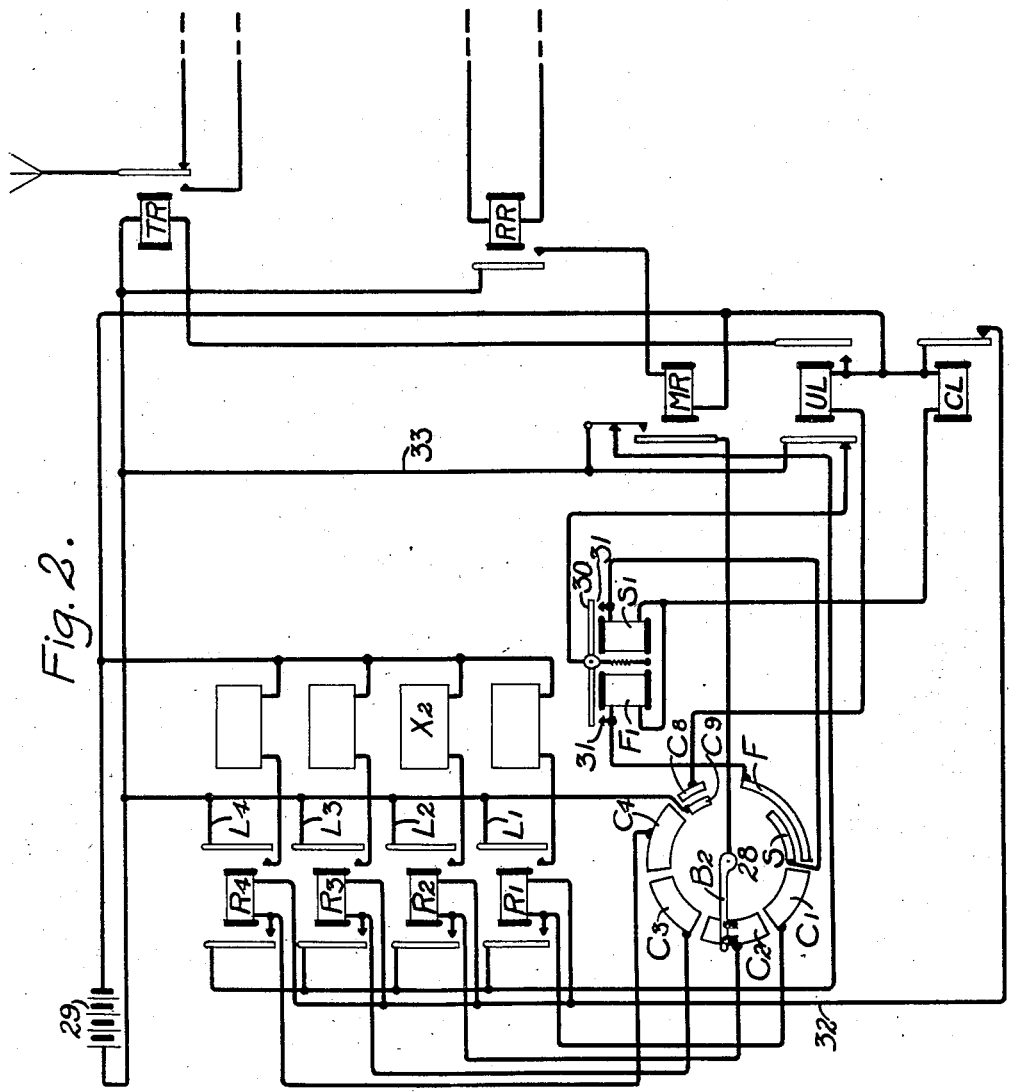

In the drawing, Fig. 1 indicates diagrammatically one form of the circuits and mechanism of a controlling or primary station; Fig. 2 those of a cooperating controlled or secondary station, and Figs. 3 and 4, the primary and secondary stations, respectively, of a modified system.

Referring to Fig. 1 in which a primary station is diagrammatically represented, antenna 1 is normally connected with radio receiving apparatus 2 and may be disconnected from this receiving apparatus and connected to constantly active transmitting apparatus 3 by a transmitting relay TR operated in response to the action of a continuously driven rotary distributor 5. The various parts of the primary station may now be considered in detail.

The receiving apparatus preferably consists of a tuned open antenna circuit comprising a variable capacity element 6 and a variable inductance 7 by which the circuit of antenna 1 may be tuned to the frequency of the unlocking impulse waves transmitted from the secondary station. Connected to one terminal of the inductance through a blocking condenser 8 with a grid leak resistance 9 is a grid or impedance control element of a thermionic detector 10 preferably of the highly evacuated three element type. The other active terminal of the inductance 7 is grounded and connected to the cathode of detector 10. The space current circuit of this detector includes a source 11 of unidirectional current and a choke coil 12. The alternating current output path of the detector is connected directly to the discharge electrodes of the detector and comprises a series resistance 13, a shunt capacity element 14 for by-passing the high frequency component of the detected current without passing the low frequency component, a series stopping condenser 15 preferably of low impedance, and a resistance 16 across the terminals of which the input terminals of amplifier 17 are connected. This amplifier, which is preferably a device of the same general type as the detector, amplifies the detected alternating current or trains of group impulses and impresses the amplified energy thereof by means of a transformer 18 upon the input circuit of a vacuum tube relay 19, the function of which is to integrate the periodic or alternating current energy, and supply a unidirectional impulse to marginal receiving relay RR, the winding of which is included in series in the space current circuit with space current source 20 and normally closed armature and contact 21 of transmitting relay TR. Obviously the circuit arrangements for detecting the incoming energy and supplying amplified detected energy to the integrating relay tube may be variously modified without departing from the spirit of the invention. A high resistance receiver Y may be shunted across the output circuit of the amplifier 17 to enable an attendant to listen for instructions or to facilitate tuning of the receiving apparatus.

Relay tube 19 comprises a filament heated by a source 22 in series with which is a resistance 23. The input circuit of tube 19 is connected to a point in resistance 23 which is negative with respect to the filament, and the grid is thus maintained such that a normal negative potential through the space current through the winding of relay RR is substantially zero or at least much below that required to energize the relay. The effect of a train of impulses impressed on the input circuit is to decrease the impedance of the tube and to permit sufficient current to flow therethrough to energize relay RR. A small disturbance will not sufficiently decrease the tube impedance to operate the relay. The relay is preferably designed to have the difference between its minimum operating current and its maximum release current very small and the circuits of the tube, its internal characteristics, and the voltages of the space current and polarizing sources, are preferably so designed and chosen that the change in current for small changes of voltage through the range of the operating and release currents is rapid and the ratio of the release current to the operating current approaches unity.

The rotary distributor 5 consists of a brush $B_1$ and a face or disc carrying a plurality of contacts $C_1$, $C_2$, $C_3$, $C_4$, etc. As in the ordinary practice of the rotary distributor art either the brush or the contact carrying member may be mounted for rotation. For simplicity it will here be assumed that the brush rotates and that the contact disc is stationary. The stationary member is mounted concentric with the axis of the constantly rotating member and is provided with a handle (not shown) whereby the operator may arbitrarily shift its position about the axis to expedite synchronization with the secondary apparatus at the beginning of operations. Associated with distributor 5 is a control switch arm C such as the "control stick" of an airplane and this carries an electrical contactor for engagement with contacts $A_0$, $A_1$, $A_2$, $A_3$, $A_4$ etc. connected respectively to the correspondingly numbered contacts of the contact disc. Normally, the control switch is in neutral position in contact with $A_0$.

Associated with rotary distributor 5 and its circuits are unlocking relay UL and a relay CL hereafter termed a "control lock". The unlocking relay has one armature and contact 24 in circuit between brush $B_1$ and relay TR, and a second armature and contact 25 in holding circuit for the unlocking relay, this circuit also including armature and normally closed contact 26 of control lock CL. A current source 27 for energizing the control lock, unlocking, and transmitting relay windings has one pole connected to the control switch and a terminal of the control lock and unlocking relays, and the other pole connected to each of armature contact 26, transmitting relay TR and distributor contact $C_5$.

The transmitter 3, shown conventionally as a rotary spark gap discharge device, is normally disconnected from the antenna with its condenser charging circuit open. Relay TR when energized serves first to disconnect the receiving apparatus and then to close the condenser charging circuit and connect the transmitting device operatively with the antenna.

Referring to Fig. 2 in which the secondary station circuits are illustrated, the showing of the radio transmitter and receiver is omitted for simplicity as these may be of the same general type as the corresponding elements in Fig. 1. The receiving relay RR and the transmitting relay TR correspond to the similar designated relays of Fig. 1. The rotary distributor 28 is similar to distributor 5 except that contacts F and S are provided for synchronizing to cooperate with contacts $C_0$ at the primary station, and contacts $C_3$ and $C_5$ serve to determine the sending of the unlocking impulse and so cooperate with the locking and unlocking contacts $C_5$, $C_6$ and $C_7$ at the primary station.

The synchronizing apparatus includes contacts S and F and electromagnet windings $S_1$ and $F_1$ connected respectively therewith, a control lock CL and a direct current source 29. Associated with the magnet windings $S_1$ and $F_1$ is an armature 30 arranged to engage contacts 31 at the terminals of these windings and to close a holding circuit therethrough, this circuit passing by way of contact of unlocking relay UL and its armature and conductor 33 to a pole of source 29.

The control apparatus includes the receiving relay RR, a master relay MR having a make-before-break contact, the control lock and unlocking relays previously mentioned and the four control relays $R_1$, $R_2$, $R_3$ and $R_4$ connected respectively with contacts $C_1$, $C_2$, $C_3$ and $C_4$ of the rotary distributor and having a common return 32 to the contact of control lock CL. Each of the control relays when energized serves to close an associated operating circuit $L_1$, $L_2$ etc. and also to close a holding circuit for itself by way of the normally closed contact of master relay MR.

The operation of the system of Figs. 1 and 2 may now be described in detail. Assuming that both distributors 5 and 28 are operating and that the radio transmitters are operating to produce high frequency energy, (the switch of the driving motor having been closed) there will be no impulses sent out from the primary station because the circuit of transmitting relay TR is open at the armature contact 24 of unlocking relay UL which cannot itself be energized until an unlocking impulse operates relay RR to close the circuit of the unlocking relay. The primary station must therefore remain inactive until such an unlocking impulse arrives. It may therefore be said to be "locked". The secondary distributor brush $B_2$ is, at starting, also disconnected electrically, but as it wipes over contacts $C_8$, $C_9$ simultaneously it completes a circuit through unlocking relay UL which pulls up its right hand armature to close the circuit of transmitting relay TR, through battery 29, and thus cause an unlocking radio impulse to be transmitted. Such an impulse will therefore be sent out each time the brush $B_2$ wipes contacts $C_8$ and $C_9$.

The unlocking impulse received at the primary station of Fig. 1 causes relay RR to be energized to close the circuit of unlocking relay UL except for the break between the contacts $C_5$ and $C_7$. It is essential therefore in order to unlock the primary mechanism that the receipt of the unlocking impulse and the transit of brush $B_1$ over contacts $C_5$ and $C_7$ occur simultaneously, a contingency which will eventually occur unless the distributors are in exact synchronism and out of phase and remain in that condition. Since it may take a considerable period for this unlocking operation to occur, it is desirable for the primary operator to be able to expedite the synchronizing action. By noting the energization of relay RR (an extra pair of contacts in circuit with a current source and a flashing lamp has been used for this purpose) and similarly ascertaining that relay UL is not periodically energizing, the operator knows that to unlock the primary there must be a relative phase shift of the distributors. He therefore moves the stationary member of distributor 5 by means of its handle until relay UL energizes with energization of relay RR. In energizing, the unlocking relay pulls up armature 25 to close a holding circuit for itself throughout most of the succeeding cycle and also closes its armature 24 to connect brush $B_1$ through transmitting relay TR and source 27 to control switch C. It is therefore evident that depending upon the contact position of switch C, transmitting relay TR will be energized and an impulse transmitted when brush $B_1$ contacts with the corresponding contact member. If C is in its normal and neutral position at $A_0$ when brush $B_1$ wipes contact $C_0$, a synchronizing impulse will be sent out by the primary mechanism.

The relation of contacts $C_8$ and $C_9$ is such that the synchronizing impulse from the primary station will reach the secondary station and operate relays RR and MR at about the time that the distributor brush $B_2$ is wiping contacts F and S, relay MR operating to connect the brush $B_2$ to positive battery. If the secondary brush $B_2$ is ahead of the primary brush $B_1$ it will be in contact with both F and S, if behind with F alone. Magnet $S_1$ is so designed that when magnets $S_1$ and $F_1$ are energized simultaneously, $S_1$ has the stronger pull on armature 30 and therefore succeeds in displacing 30 to the "slow" position. If the synchronizing impulse comes at the time when brush $B_2$ is in contact with F alone, magnet $F_1$ will be energized and will pull armature 30 to the "fast" position where it will be held, since the magnet $S_1$ when it later energizes will not be able to displace it. In the absence of any synchronizing impulse the armature will be maintained in a neutral position by springs or equivalent devices. Movement of the armature either to "slow" or "fast" directly controls a governing mechanism (not shown) of the motor which drives distributor 28. Obviously this armature might control the field energization of the motor if the latter were electrical, or it might operate upon the transmission gear in a manner well known in the rotary distributor art. Such arrangements are well known and are therefore not illustrated. The armature 30 in contacting with either of its contacts 31 closes a holding circuit for itself from source 29, left hand armature and contact of unlocking relay UL armature 30, winding $F_1$ or $S_1$, control lock CL and back to battery. Near the end of the cycle when brush $B_2$ wipes contacts $C_8$ and $C_9$ to energize unlocking relay UL, this relay opens its left hand armature contact and the holding circuit for synchronizer armature 30, thus releasing this armature to normal position.

The secondary brush accordingly has three speeds, normal with armature 30 in neutral position, slow with 30 attracted by S and fast with 30 attracted by F. These speeds never change and the brush $B_2$ has a constant speed throughout any particular revolution but the speeds of successive revolutions differ as they may be normal, fast, or slow.

As has just been explained each synchronizing impulse received at the secondary station at approximately the synchronizing period causes control lock CL to be held energized until the brush $B_2$ has traversed nearly a cycle to the position of contacts $C_8$ and $C_9$. Control lock CL accordingly holds up its armature during this period and the common return 32 of relays $R_1$, $R_2$, $R_3$ and $R_4$ is thus interrupted. These control relays are accordingly locked by the control lock in non-responsive conditions during the cycle immediately following a synchronizing impulse. Suppose now that the primary station operator desires to cause relay $R_2$ to operate. He moves control switch arm C from neutral to $A_2$. Brush $B_1$ when it next passes $C_0$ will not cause a synchronizing impulse to be transmitted. Brush $B_2$ in traversing $C_8$ and $C_9$ has energized unlocking relay UL to release synchronizing armature 30 and to unlock control lock CL and so put the control relays in operative condition. At the same instant unlocking relay UL causes an unlocking impulse to be transmitted to the primary station. Brush $B_1$ is at that instant at contacts $C_5$ and $C_7$ and primary station unlocking relay UL is energized and closes its own holding circuit and thus causes the brush $B_1$ to be connected to transmitting relay TR throughout the immediately succeeding cycle. The primary mechanism is now unlocked and on passing contact $C_2$, brush $B_1$ causes a control impulse to be transmitted to the secondary station at which time brush $B_2$ is traversing contact $C_2$. The control impulse actuates relays RR and MR in turn and the latter in pulling up its armature closes the circuit of operating relay $R_2$ which closes its right hand armature contact to provide a holding circuit by way of source 29, conductor 33, back contact of relay MR, armature contact and winding of relay $R_2$ common return 32 and armature contact of relay CL back to source 29. While relay MR is energized as determined by the length of the received impulse, the armature of the relay is on its front contact. When the relay is deenergized the armature does not break its contact until after the back contact is closed. Accordingly, operating relay $R_2$ remains energized first by way of an energizing path, and upon release of relay MR, by way of a holding circuit. If control arm C remains at $C_2$ during one or more succeeding cycles, the only operation at the secondary station is that of relays RR and MR. Energization of MR, which operates as a make-before-brake relay, will close the direct energizing circuit of relay $R_2$ before opening the holding circuit, and deenergization will cause the converse action all without disturbing the condition of relay $R_2$. Accordingly the operation of relay $R_2$ and its operated circuit apparatus $X_2$ may be continued as long as desired. During this period there is no synchronizing, but the relative phase shift of the two distributors throughout a considerable number of cycles is, in most cases, slight. As soon as the control switch is returned to neutral the emission of control impulses ceases and that of synchronizing impulses begins. The first synchronizing impulse causes CL to be energized and to open the holding circuit of $R_2$ thus stopping its particular operation. The actuation of each of the other operating circuits is similarly accomplished and it is to be understood that although only four of these are illustrated there may be as many as is desired.

Figure 3:
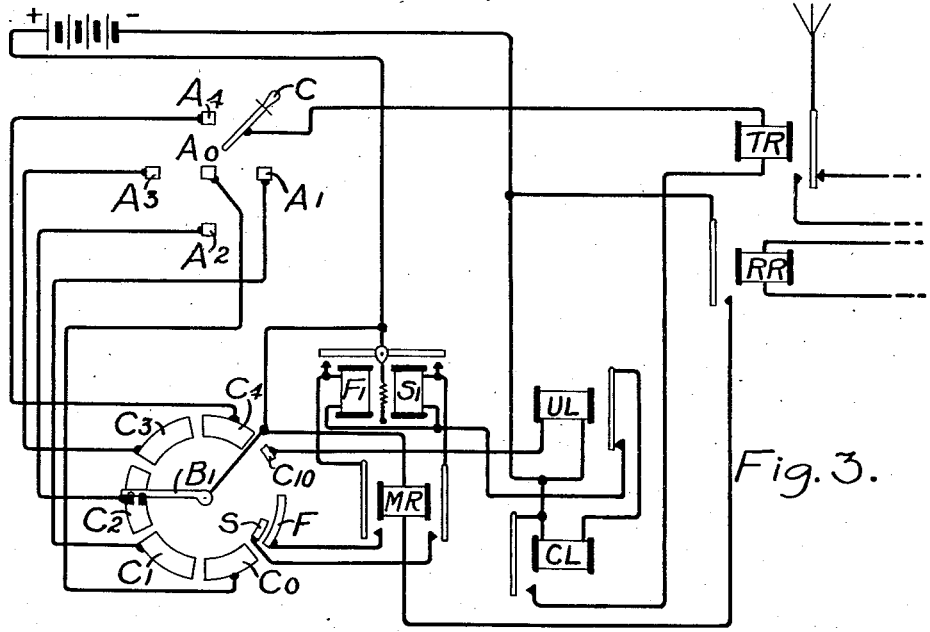
Figure 4:
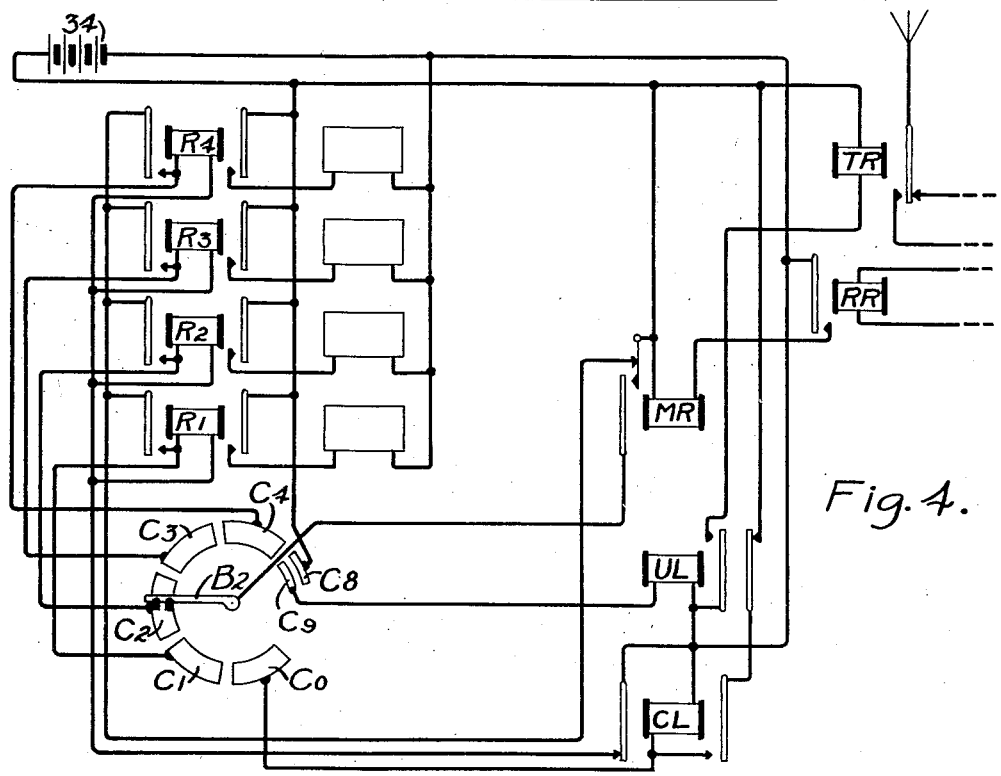

The system of Figs. 3 and 4 differs from that just described principally in that the synchronizing apparatus is placed at the primary station and the unlocking impulses from the secondary station serve also to synchronize the primary distributor. When unlocked the primary station sends out either locking or control impulses, a locking impulse serving to lock the secondary controls in inoperative condition and the control impulse serving to operate a particular control relay.

Referring to Figs. 3 and 4, in which the radio transmitting and receiving apparatus are omitted for simplicity, the correspondingly designated members and circuits function in a manner similar to that of the members and circuits of the system of Figs. 1 and 2.

During each revolution, secondary brush $B_2$ (Fig. 4) connects segments $C_8$ and $C_9$ to close the circuit of unlock relay UL to battery thus causing this relay to pull up its front contact and energize relay TR to transmit an unlocking impulse to the primary station. At the same time, secondary station relay UL pulls up its outer armature which is in the holding circuit of control lock CL. The unlocking impulse, if the two distributors are approximately in step, arrives at the primary station as brush $B_1$ is either on contact F or on both contacts F and S. The unlocking impulse energizes relay RR to close its contact thus energizing master relay MR which pulls up its armature. A closed circuit may now be traced from positive battery through brush $B_1$, contact F or S, armature and contact of MR, winding $F_1$ or $S_1$, armature of relay UL, winding of control lock CL, back to battery. Synchronizing magnets $F_1$ and $S_1$ are similar to those of Fig. 2 and operate in the same way so that whichever is actuated closes a holding circuit for itself through the common armature. This holding circuit includes control lock CL which is held energized over a corresponding period. This action is different from that of the relay CL in Figs. 1 and 2 in that the primary control is locked in operative position by CL. Accordingly an impulse will be sent to the secondary station by relay TR when brush $B_1$ engages the contact corresponding to the position of switch arm C. If C is at $A_0$, $B_1$ in contacting with $C_0$ will send out a locking impulse. If C is on one of the contacts, $A_1$ to $A_4$ a control impulse will be sent out. If a locking impulse is transmitted, relay MR at the secondary station will energize as brush $B_2$ wipes contact $C_0$ thus closing the circuit of control lock CL which pulls up its left hand armature to open the common return of control relays $R_1$ to $R_4$ inclusive, and pulls up its right hand armature to close a holding circuit for itself from source 34 through back armature and contact of unlock relay UL. The effect of a locking impulse transmitted to the secondary station is therefore to prevent any interference with, or operation of, the control relays during that cycle. When brush $B_2$ next engages contacts $C_8$ and $C_9$ it will cause relay UL to be energized to open the holding circuit of the control lock. If for example switch C at the primary station has now been moved to contact $C_2$, no locking impulses will be transmitted to the secondary station and the control lock CL thereat will remain deenergized. When, therefore, brush $B_2$ traverses contact $C_2$ the received control impulse will energize MR to close an energizing circuit for control relay $R_2$ which in turn energizes to control its associated circuit. Relay $R_2$ pulls up its holding circuit armature and as relay MR closes the holding circuit before breaking the energizing circuit, relay $R_2$ remains energized until its holding circuit is opened by a subsequent locking impulse causing the energization of relay CL. This arrangement permits a very short unlocking impulse to serve also for synchronizing since relay MR can be energized thereby and the synchronizing magnets once energized are held energized for the remainder of a cycle. The synchronizing apparatus is located at the primary station and may be observed by the operator who is thus enabled to supervise its regulation more closely than is possible in the case where it is located at the distant secondary station. In this arrangement synchronization is independent of the controls. This is a distinct advantage in that no opportunity is given for a distributor once in step to get out of step through a long operating period.

An important feature of the invention is the transmission of impulses from the secondary to the primary station. This permits joint control by the two stations and greatly simplifies the apparatus at the remote station. It also permits such apparatus as the synchronizer to be placed at the primary station.

It is to be understood that although disclosed in connection with radio operation, the features of this invention are equally applicable to conductive electrical systems or in fact to energy transmission systems of any nature whether electrical or not.

What is claimed is:

1. In combination, a control mechanism and a distant controlled mechanism, each of said mechanisms comprising a constantly moving element, means at said control mechanism for transmitting energy to operate said controlled mechanism, and means at said control mechanism for preventing transmission of said energy except when such elements are in synchronism and phase agreement.

2. In combination, a moving controlled mechanism and a distant moving control mechanism, controlled devices at said controlled mechanism, and means at said controlled mechanism for preventing operation of said controlled devices except when said moving mechanisms are in synchronism.

3. A system of distant control comprising continuously and synchronously moving mechanisms, apparatus to be controlled associated therewith, and means to prevent operation of said apparatus when said mechanisms are not in proper relative phase relation.

4. In combination, a control station, a distant controlled mechanism, a transmitting circuit at said control station for transmitting energy to said controlled mechanism, said circuit having a normally open armature contact, and means at said controlled mechanism for causing closure of said armature contact when said mechanism is in proper condition for receiving energy.

5. A controlled station and a controlling station, each having cyclically operating mechanism, a normally inoperative transmitter at said controlling station, means for synchronizing said mechanisms, and means for rendering said transmitter operative dependent upon said mechanisms being in synchronism and phase agreement.

6. In combination, primary and secondary stations, constantly moving mechanisms at each of said stations, means at one of said stations inoperative except during synchronism of said mechanisms to control the operation of the other station, and means at said other station to maintain said mechanisms in synchronism.

7. In combination, a controlling mechanism for transmitting control impulses, said mechanism being normally in non-operative impulse transmitting condition, a controlled mechanism responsive to control impulses, and means actuated by said controlled mechanism when in proper impulse receiving relation with respect to said controlling mechanism to restore said controlling mechanism to operative impulse transmitting condition.

8. A receiving station comprising a rotary distributor having a plurality of control contacts, controlled elements connected with each of said contacts in circuits having a common return path, an additional contact having a control lock connected thereto, a moving element adapted to engage each of said contacts in sequence, and means responsive to an impulse received while said element and additional contact are in engagement for causing said control lock to disconnect said common return path from the controlled elements.

9. A teledynamic system comprising controlling and controlled stations, each having radio transmitting and receiving apparatus and constantly moving mechanisms, means for maintaining said mechanisms in synchronism, means at said controlling station for transmitting radio controlling impulses to said controlled station, and means at said controlled station for transmitting radio impulses to said controlling station to indicate the state of synchronization of said mechanisms.

10. In combination, a primary station and a secondary station, each having rotary distributors, controlling mechanism at said primary station, controlled mechanism at said secondary station, means actuated by said controlling mechanism for transmitting impulses to determine the duration of actuation of said controlled mechanism, and means for rendering the impulse transmitting means inactive except when said rotary distributors are in synchronism and in phase agreement.

11. In combination, a controlling station, a controlled station, a transmitter at said controlling station, means for rendering said transmitter inoperative, means at said controlled station transmitting energy periodically to said controlling station, a moving element at said controlling station, and means responsive to the receipt of said periodic energy at a definite position of said moving element to render operative said normally inoperative transmitter.

12. A controlling station, a controlled station, receiving means at said controlled station responsive only to impulses consisting of continuous trains of waves of a given wave periodicity and exceeding a given intensity, means at said controlling station for transmitting impulses to said receiving means, said transmitting means being normally inoperative, and means responsive to energy received from said controlled station to render said transmitting means operative.

In witness whereof, I hereunto subscribe my name this 3rd day of December, A. D. 1920.

ARTHUR A. OSWALD.